United States Patent [19]

Gross

[11] 4,366,018
[45] Dec. 28, 1982

[54] METHOD AND APPARATUS FOR PRODUCING INTRAMURAL WAX SEALS BETWEEN THE COMPARTMENTS OF MULTIMEDIA TUBES

[75] Inventor: Ralph C. Gross, Flemington, N.J.

[73] Assignee: Hunterdon Occupational Training Center, Flemington, N.J.

[21] Appl. No.: 238,437

[22] Filed: Feb. 26, 1981

[51] Int. Cl.³ ............... B05D 1/28; B29C 27/04
[52] U.S. Cl. ..................... 156/273.9; 29/527.2; 29/530; 118/56; 118/225; 118/243; 118/263; 118/620; 156/274.4; 156/293; 156/305; 156/379.7; 156/578; 427/49; 427/376.1
[58] Field of Search ............ 156/275, 293, 305, 379.7, 156/499, 578, 273.9, 274.4; 427/49, 375, 376.1; 215/233; 118/620, 56, 225, 243, 263; 29/527.1, 527.2, 530

[56] References Cited

U.S. PATENT DOCUMENTS

| | | | |
|---|---|---|---|
| 900,240 | 10/1908 | Valentine | 215/233 |
| 916,190 | 3/1909 | Peck | 215/233 |
| 1,057,560 | 4/1913 | Kithil | 118/56 |
| 1,313,503 | 8/1919 | Petersen | 215/233 |
| 1,428,711 | 9/1922 | Roehrig | 215/232 |
| 1,834,085 | 12/1931 | Bloom | 229/43 |
| 2,085,392 | 6/1937 | Reichel | 128/272 |
| 2,174,855 | 10/1939 | Hoffman et al. | 215/233 |
| 2,997,397 | 8/1961 | Doulgheridis | 426/402 |
| 3,072,831 | 1/1963 | Kurland et al. | 361/433 |
| 3,101,863 | 8/1963 | Jackson, Sr. | 215/247 |
| 3,505,858 | 4/1970 | Kohn | 118/243 |
| 4,181,223 | 1/1980 | Millet | 206/365 |

Primary Examiner—Michael G. Wityshyn
Attorney, Agent, or Firm—Martha G. Pugh

[57] ABSTRACT

A plastic tubular member, open longitudinally along one side, is compartmented across its width to receive a plurality of media for supporting different bacteria cultures; and is equipped with an inoculating wire which extends axially along the tubular member through aligned intramural openings between the compartments. To prevent contamination between compartments, and maintain them in a sterile condition before introduction of bacteria cultures, the intramural openings are sealed with drops of wax in a two-step process. In a first step, the inoculating wire, which extends beyond the ends of the tubular member, serves to support the tubular member with the compartment openings directed downward over a vat of molten wax. A reciprocating comb having a plurality of prongs is mechanically moved from a lower position in which it is immersed in the molten wax, to an upper position, in which the prongs engage the compartment openings. The prongs of the comb have recesses or V-shaped notches in the upper ends, which function to carry puddles of molten wax to immerse and coat portions of the inoculating wire when the prongs engage the respective tubular compartments. In a second step, the plastic tubular member is disposed in a vertical position with the terminals of the inoculating wire engaged in closed-contact relation with the contacts of a heater circuit which heats the inoculating wire causing the wax deposits thereon to flow into and hermetically seal the space between the wire and the aligned intramural openings in each of the compartments.

13 Claims, 7 Drawing Figures

METHOD AND APPARATUS FOR PRODUCING INTRAMURAL WAX SEALS BETWEEN THE COMPARTMENTS OF MULTIMEDIA TUBES

BACKGROUND OF THE INVENTION

A number of pharmaceutical suppliers manufacture and sell compartmented tubular devices adapted for performing standard tests on a plurality of color coded biochemical media simultaneously. This is done by means of an inoculator wire which is first dipped into a selected bacteria colony and then interposed and pulled longitudinally through a series of aligned intramural openings in the compartmented multimedia tubular device.

A particular problem which arises in packaging and transporting these multimedia tubular members for laboratory use in the maintenance of a strict sterility in each of the media-filled compartments prior to inoculation with selected bacteria by means of the inoculating wire. It is thus important prior to use to provide hermetical seals between the longitudinally interposed inoculating wire and the aligned intramural openings between compartments in which the wire is removably disposed. This is normally done by providing a wax seal around each of the openings after the inoculating wire is in place for packaging or shipment.

In the prior art, it was necessary to provide these intramural seals by manually deploying a hyperdermic needle or similar device to each opening individually, and dispensing a globule of wax. In a later prior art development by applicant, all of the openings in each of the compartments were treated simultaneously by suspending the multicompartmented tubular member across the top of a vat of molten wax and deploying a reciprocating comb to pick up wax from the vat and bring it into contact with a portion of the inoculating wire in each of the compartments. The compartmented tubular member was then disposed vertically to close an electrical circuit of which the inoculating wire forms a part, causing the wax from each of the portions of the inoculating wire to flow into and seal the intramural openings of the compartments. In this particular prior-art embodiment, the prongs of the comb were rounded on the top, making it difficult, if not impossible, for the reciprocating comb to bring enough wax in contact with the inoculating wire to form a proper intramural seal between the aligned opening in each of the compartments and the interposed inoculating wire when the wire is heated with the tubular member in vertical position during a second operation sealing step.

SHORT DESCRIPTION OF THE INVENTION

Accordingly, it is the broad object of the invention to provide an improved method and apparatus for forming sterile multimedia tubular members for the differential identification of bacteria cultures.

A more particular object of the invention is to allocate sufficient quantities of molten wax to the point of the seal to insure the formation of a seal between the interposed inoculating wire and the aligned intramural openings of the compartments to insure that a hermetical seal is formed which is sufficiently strong to resist being disrupted or broken during the period when it is being packaged or shipped, prior to use, thereby maintaining the sterility of the multicompartmented tube during that period.

These and other objects, features and advantages are realized in an improved method and apparatus in accordance with the present invention for providing intramural seals in compartmented multimedia tubular members in which the device being processed is suspended by the terminals of the interposed inoculating wire above a vat of molten wax in which is disposed a comb having prongs whose upper surfaces have recesses or depressions deep enough to accommodate a substantial accumulation or "puddle" of molten wax. At the uppermost position of the comb, the prongs are constructed to penetrate each of the openings of the multicompartmented tubular member in such a position that successive portions of the inoculating wire in each of the compartments are partially or fully immersed in the puddle of wax with which it is brought in contact.

In the preferred embodiment of the invention, the recesses or depressions in the tops of the prongs take the form of V-shaped notches extended through the width of each prong, with the nadir of each "V" centered across the thickness of the comb, the nadirs being aligned along the length of the comb. It will be understood, however, that the recesses or depressions need not necessarily be V-shaped, but may assume other forms, such as, for example, concave surfaces of spherical or elipsoidal shape, or, in fact, any shape providing a depression which is designed to hold a sufficient quantity of wax to immerse, or at least, partially immerse the inoculating wire when the comb is in engagement with the tube compartments at the upper extension of its excursion. Thus, a sufficiently thick coating of wax is deposited on the successive portions of the inoculating wire interposed into each of the compartments of the multimedia tubular member so that during the second step of the process when the multimedia tube is vertically positioned to close a heater circuit, the wax flows down into the space between each of the intramural openings and the inoculating wire, thereby forming a series of hermetical intramural seals which are of sufficient strength to resist disruption and breakage during packaging and shipment of the multimedia tubular members prior to use.

Other objects, features and advantages of the invention will be better understood from a detailed study of the specification hereinafter with reference to the attached drawings.

SHORT DESCRIPTION OF THE DRAWINGS

FIG. 4 is an enlarged view of the compartmented multimedia tubular member partly broken away to show one or more prongs of the comb engaged with respective compartments, and so positioned that the longitudinally disposed inoculating wire is immersed in the wax puddles contained in successive V-shaped notches in the prongs.

FIG. 5 is an enlarged perspective showing of the comb of the apparatus of FIG. 2 and 3, clearly showing the V-shaped notches in the prongs.

DETAILED DESCRIPTION OF THE INVENTION

Multimedia compartmented tubular members manufactured for microbiological experimentation and other pharmaceutical applications are designed to incorporate in a single device a large number of media for simultaneous inoculations from a single colony or source of bacteria. Typical examples of these devices, which are sold ready for laboratory use, with each of the compartments filled with a different culture medium, are products sold by Hoffman LaRoche, Inc. under the trademarks "ENTROTUBE II, and OXI/FERM TUBE."

Figure 1:
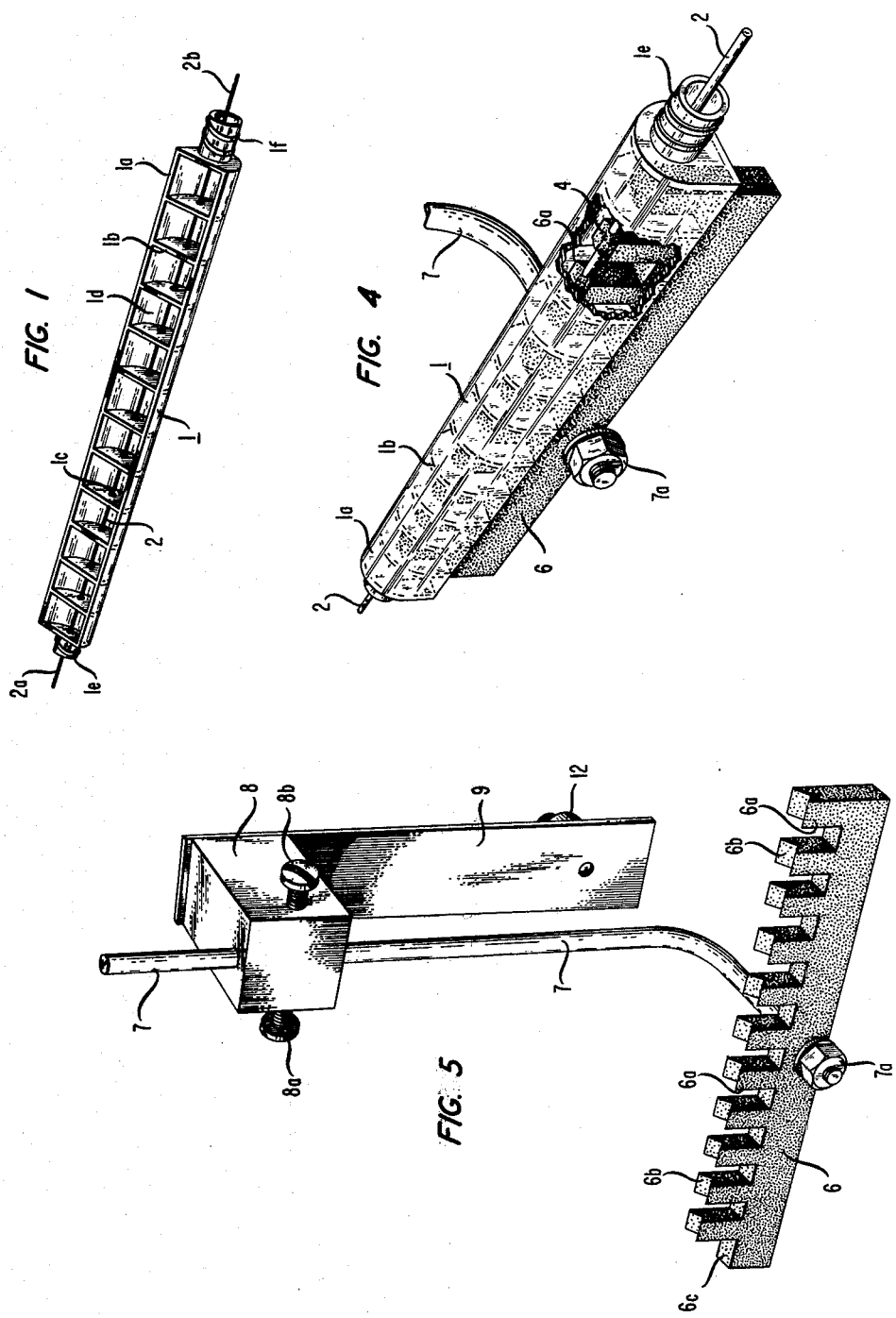
FIG. 1 shows a typical compartmented multimedia tubular member in upended position prior to an operation for providing intramural wax seals between the compartments.

An important part of the process of manufacturing these tubular members is maintaining the devices sterile and free from contamination prior to inoculation with selected bacteria during laboratory experimentation. FIG. 1 shows, in upended position, a compartmented multimedia tube 1, of the type coming within the purvue of the present invention, as initially constructed, and prior to having its compartments filled with a plurality of media for test use.

In an illustrative example, the device comprises a partially-cylindrical tubular member of a suitable rigid transparent plastic, such as, for example, high density polyethylene or polypropylene, or the like, having a wall thickness of 1.5 millimeters, and a length of about 14 centimeters. The tubular device 1 is open along one side, the overall dimension across the open side being 1.6 centimeters. The overall cross-sectional dimension normal to the plane of the open side and the closed rounded portion of the tubular wall 1a is also about 1.6 centimeters. The tubular member 1 is subdivided by a series of section walls 1b along its length into a plurality of compartments, (12 in the present example) substantially closed except for the opening in cylindrical wall 1a, so that the compartments open in a direction normal to the principal axis of the tubular member 1. Each of the compartments has an inner dimension of about 1.3 centimeters in the plane of the open side of the tubular member, and a maximum of 1.3 centimeters in a direction normal to the plane of the open side. At the center of curvature of the curved edge of each flat section wall is a round opening 1c which is 0.15 centimeters in diameter. The longitudinally aligned openings 1c form a series of bearing surfaces which together support the inoculating wire 2. In the present embodiment, the latter, which may be formed, for example, of stainless steel or other non-magnetic material, is 0.076 centimeters in diameter and is interposed longitudinally into tubular member 1 through screw-threaded connector collar 1e on one end, and extends through openings 1c in each of the compartments protruding from the connector collar 1f on the other side. The terminals 2a and 2b of inoculating wire 2 extend about 1.3 centimeters beyond the ends of connector 1e and 1f.

Figure 7:
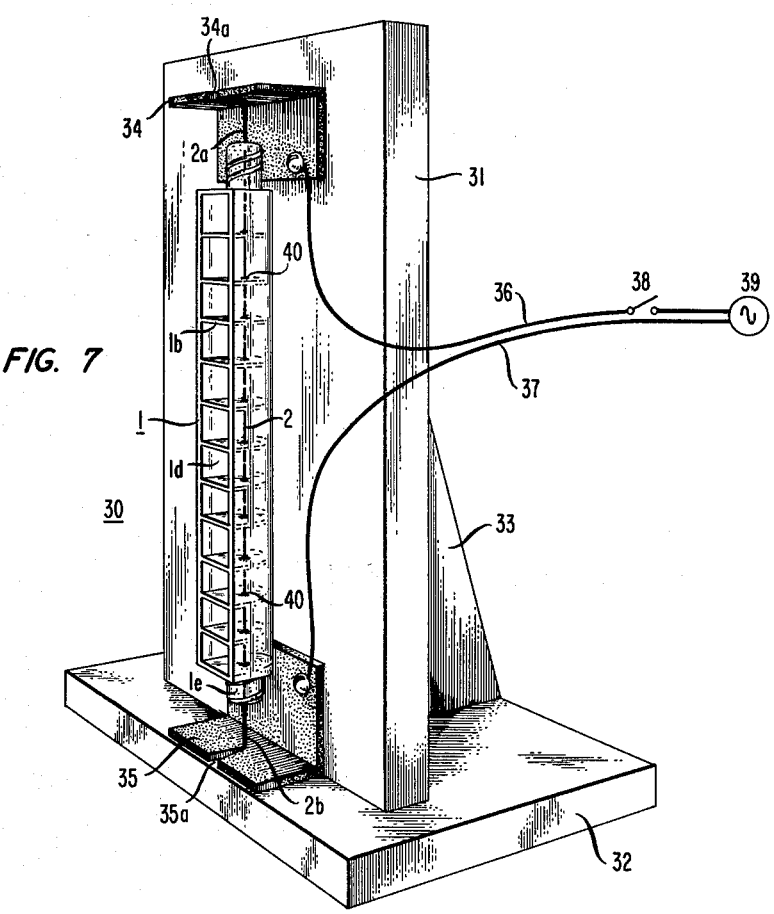
FIG. 7 is a showing in perspective of the multimedia tubular member installed in vertical position in an apparatus for heating the inoculating wire and melting the wax to create seals in the intramural openings between the tubular compartments.

In accordance with the method and apparatus of the present invention the openings 1c are sealed around the inoculating wire 2 in a two-step process, which eventuates in a solid globule of wax 40 which hermetically seals each of the intramural openings 1c, as shown in FIG. 7. An important feature of the present invention is that a reproducible seal 40 is produced in each case which is of sufficient strength and thickness to completely protect the sterility of the contents in each of the compartments of tubular member 1, and to resist breakage or disruption prior to laboratory use.

Figure 2:
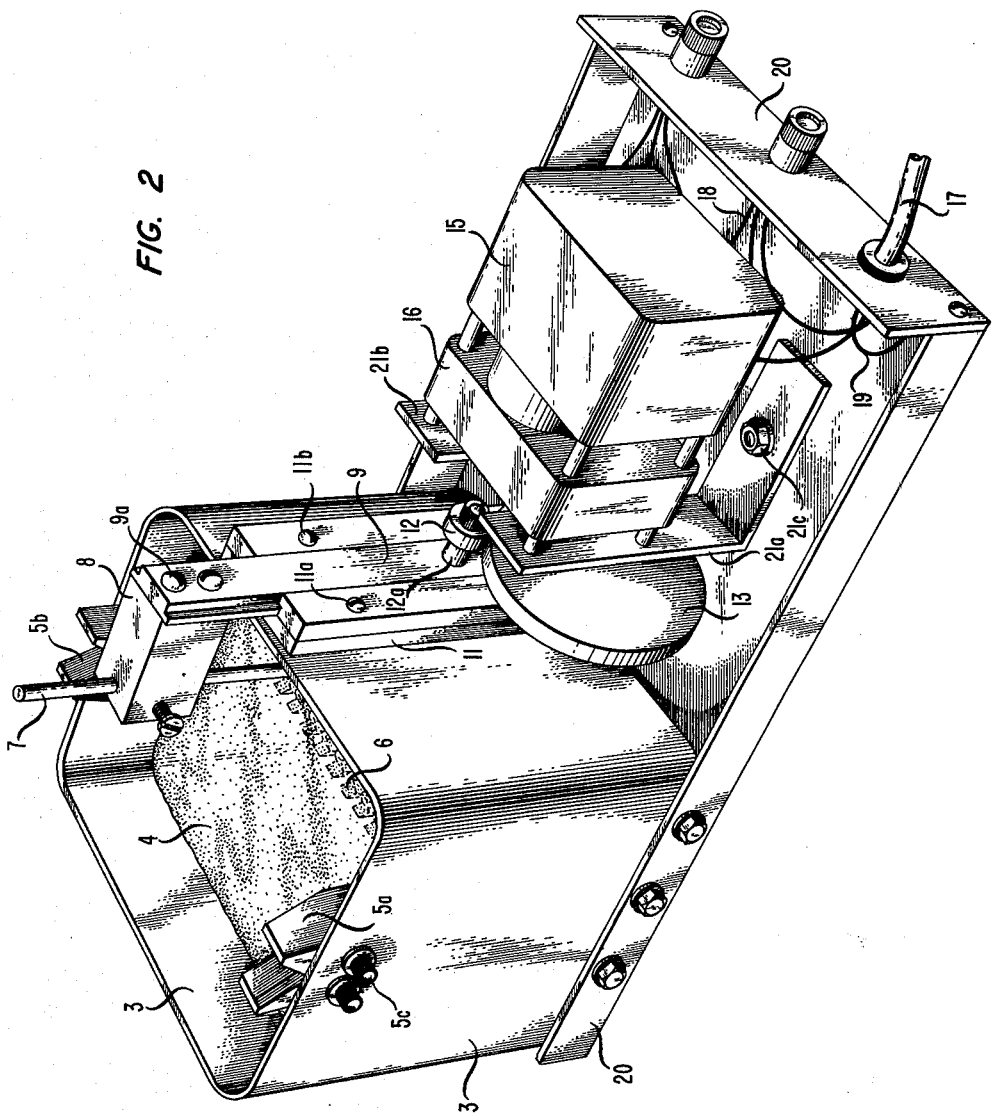
FIG. 2 is an overall perspective showing of an apparatus including a vat of hot wax enclosing a reciprocating comb mechanism for providing wax seals for the compartmented multimedia tube, the comb being shown in the "down or rest position".
Figure 3:
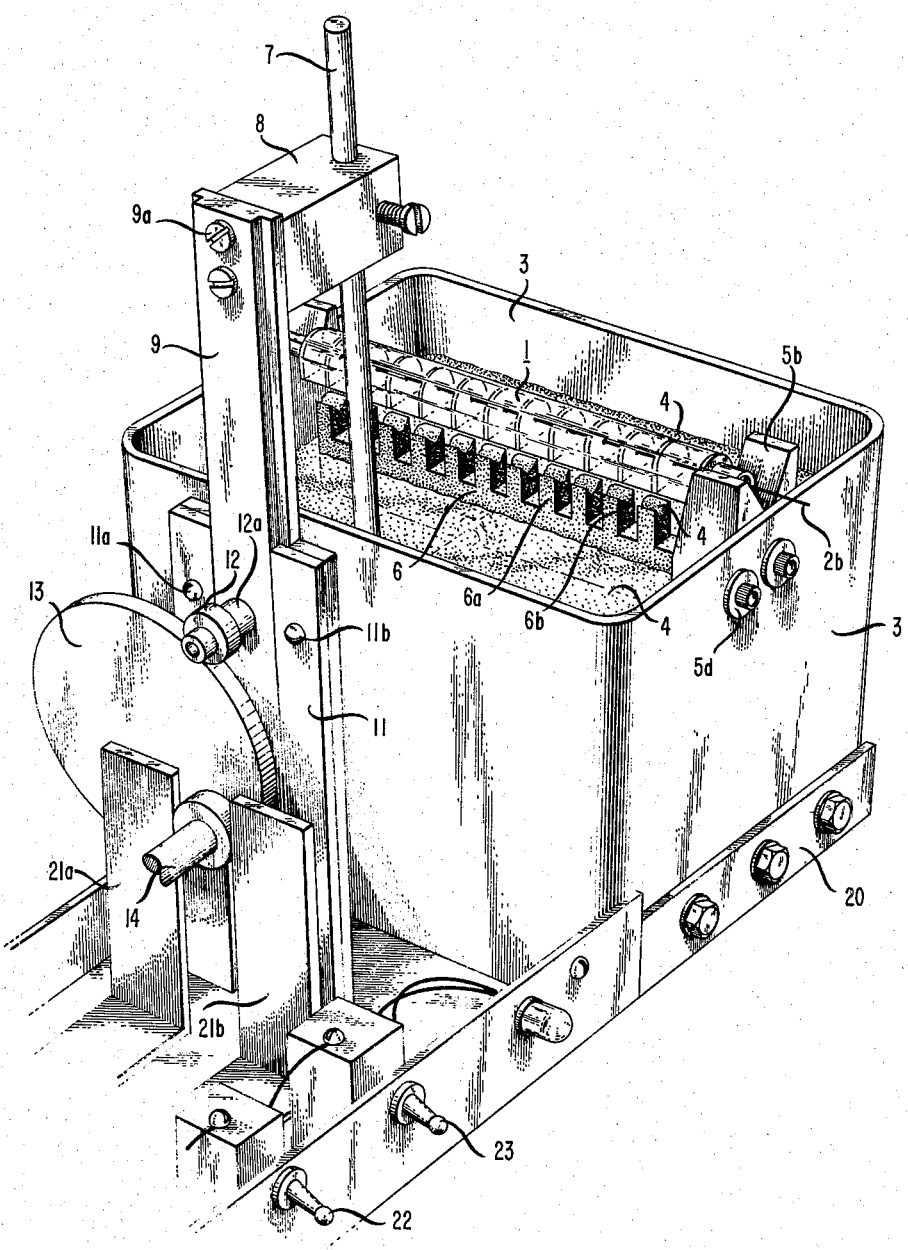
FIG. 3 is an overall perspective showing of the apparatus of FIG. 2 with the comb in "raised" position prior to engaging the interior of the multimedia tubular compartments.

In accordance with the first step of applicant's process, the multicompartmented tubular member 1 is disposed with its open end directed downward over a vat 3 of hot wax, of the general form shown in FIGS. 2 and 3 of the drawings. The tubular member 1 is suspended across the open upper end of the vat 3 by means of the terminals 2a and 2b of the inoculating wire 2 which is interposed longitudinally in tubular member 1. The terminals 2a and 2b, respectively, rest in a pair of V-shaped yokes 5a and 5b (See FIG. 2) which are bolted or otherwise secured to the inner walls by bolts 5c (not shown) and 5d in centered positions near the top end walls of the vat 3.

Interposed for reciprocating motion in the vat 3 is a comb 6 having a plurality of prongs 6a with recessed or notched ends which function to move up vertically from a position beneath the level of liquid 4 to a position in which the prongs 6a simultaneously engage the openings in the compartments of the tubular member 1, immersing portions of the wire 2 in each of the compartments to provide a coating of wax. In the present example vat 3 is filled with one liter of a wax bath 4 which melts at a temperature in the range 150° to 200° Fahrenheit, and solidifies within a short period of the order of 30 seconds at ambient temperatures to form a solid mass impervious to gases and liquids. This may, for example, comprise any sealing wax formulation, such as, for example, any well-known types of waxes which quickly solidify at room temperature. Small amounts of mineral oil may be added to the molten wax to decrease its viscosity.

In the present embodiment, the vat 3 is substantially rectangular, having overall dimensions of 13 centimeters wide by 18 centimeters long and 19.5 centimeters deep, and internal dimensions of 12 centimeters wide, by 17 centimeters long, by 16 centimeters deep. In accordance with the example under description, the bath 4 is brought to a molten state by means of a conventional electrical heater 23 which is mounted beneath the vat 3, on a conventional heat-resistant base 20. The electrical circuit which powers the heater 23 will be described hereinafter with reference to FIG. 6 of the drawing.

The comb 6, which is a unique feature of the present invention, is shown in detail in FIG. 5 of the drawings. In the present embodiment, comb 6 is formed from an aluminum slab which is 0.6 centimeters thick, 13 centimeters long and 1.6 centimeters in overall height. The upper edge of the comb 6 is cut through the thickness to form a plurality (11 in the present embodiment) of parallel prongs or teeth 6a, each one of which is 5 millimeters wide, and which are spaced-apart at intervals of 0.6 centimeters. The prongs or teeth 6a which are each 1.5 centimeters high, are supported on a base 1.6 centimeters high, which extends longitudinally to the left in FIG. 5 a distance of 1.2 centimeters beyond the first prong or tooth. In the present embodiment, into the upper end of each of the prongs or teeth 6a is cut a notch of V-shaped cross-section, which, for example, extend vertically downward about 3 millimeters, the nadir of the V being centered at the top of each prong along a line running longitudinally half-way through the width of comb 6 so that the V-shaped cuts 6b are longitudinally aligned, and are constructed, when the comb 6 is at its uppermost vertical position, to engage the open ends of compartments of tube 1, so that the legs of the V's at least partially enclose successive portions of wire 3. Thus, when the comb 6 is moved from its position of lowest extremity below the surface of the liquid wax bath 4, the V-shaped notches or depressions 6b each carry a puddle of molten wax in which successive portions of the inoculating wire 2 tend to be partly or wholly immersed, and thereby coated.

The comb 6 is supported on the screw-threaded lower end of arm 7, which is bent substantially at right angles, the comb being rigidly fastened thereto by means of a screw-threaded nut 7a. In the present embodiment the screw-hole and fitting for nut 7a is centered on the front vertical wall of comb 6 about 0.6 centimeters above its lower end. The rod 7 is 0.64 centimeters in diameter, the horizontal end protruding 4.5 centimeters from the center rear of comb 6 and the vertical portion extending upward 18.2 centimeters.

The vertical portion of the rod 7 is mounted for slidable vertical motion in a bore near the front, center of a bearing member 8 which comprises a rectangular block 2.5 centimeters wide and 1.5 centimeters thick of aluminum or stainless steel or other rigid material, which is supported so as to project 3.8 centimeters over the vat 3. The pair of set screws 8a and 8b enable the vertical position of the rod 7 to be adjusted so that the reciprocating comb 6 is beneath the level of liquid bath 4 at its lowest extremity, and engages the openings of tubular member 1 at its upper extremity. Thus, successive portions of the inoculation wire 2 are interposed between the walls of the V, and partially or wholly immersed in the puddle of wax therein. The bearing member 8 is supported on a flat downwardly-projecting rectangular plate 9 by means of vertically-extended edge flanges which key into and move slidably in a vertically-disposed slot 1.4 centimeters wide in track member 11 which extends down a vertical distance of 19 centimeters and is mounted by a pair of conventional screws or bolts 11a, 11b to one external wall of the vat 3. Centered 2½ centimeters above the external lower end of the vertically extending plate 9, is a supporting stud 12, on which is rotatably mounted a cam-follower wheel 12, which in the present embodiment is 1.5 centimeters in diameter.

An eccentrically mounted cam 13, which is, in the present embodiment, a large disc, for example 9 centimeters in diameter, is driven to rotate by means of drive shaft 14 coupled to motor 15 through an intervening gear mechanism housed in the gear box 16. The shaft 14 is eccentrically located about ½ centimeter from one edge of the cam 13 so that each rotation of the cam 13 causes plate 9 to rise and fall through a distance of 7½ centimeters as it moves vertically in the slotted track 11. The rectangular block 8 is thus moved up, causing a corresponding reciprocating vertical motion of the comb 6 in the vat 3.

Figure 6:
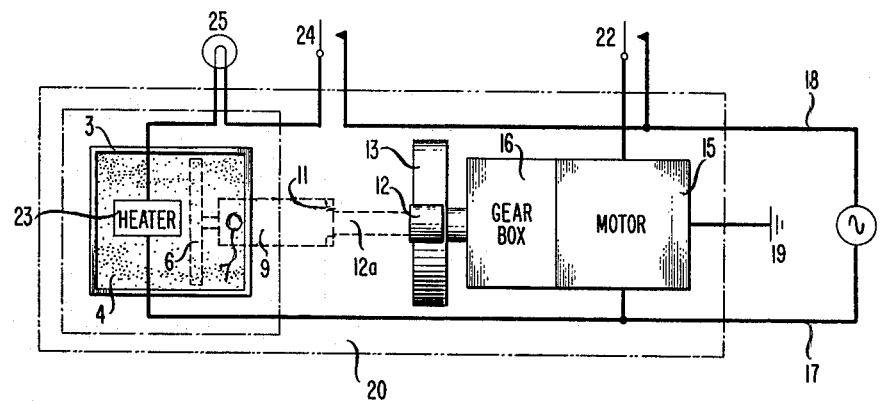
FIG. 6 is a plan view of the apparatus of FIG. 2 showing the circuit schematic.

Referring to FIG. 6, the motor 15 is a conventional type having up to, say, a 100 watt rating, which is designed to operate at 110 volts from a conventional alternating current source which is connected between the lead wires 17 and 18 as shown in FIG. 6. The circuit is grounded, for example, through contact 19, by being connected to the metal supporting chassis 20. The motor may be turned on and off by a conventional toggle switch 22.

The heater 23 for wax vat 3 is connected in parallel with the motor 15 across the alternating current output terminals 17 and 18, under control of a conventional toggle switch 24. A signal light 25 connected in series with the heater circuit indicates whether or not the heater circuit is on.

Operation of the device shown in FIGS. 2 and 3 is as follows.

The switch 24 is first depressed to its "on" position, causing the heater to heat up the wax bath to a temperature of between 150° and 200° Fahrenheit. The preferred temperature is about 180° Fahrenheit. When the bath has been heated up to the proper temperature, the tubular member 1 is placed so that the terminals 2a, 2b of the inoculating wire 2 rest in the yokes 5a and 5b, suspending the tubular member 1 over the bath 4 with the open sides of the compartments directed downwardly. The switch 22 is then depressed to start up the motor, which drives the cam 13 through a conventional gear system in gear box 16, to rotate eccentrically at a speed of, say, 40 revolutions per minute.

The rotating cam 13, in engagement with cam-follower 12, drives plate 9 up and down vertically, thereby periodically raising and lowering the pronged comb 6 from a lower or first position at which it is completely immersed in the wax bath 4, to an upper or second position in which the prongs 6a of comb 6 each enter a respective one of the downwardly-directed openings in the compartments of tubular member 1. In the second position, at the upper end of its excursion, the wax puddles carried in the V-shaped notches of each of the prongs 6a either partially or fully immerse the successive portions of inoculating wire 2 in each of the compartments. When the comb 6 is lowered by continuing rotation of cam 13, the wax tends to congeal forming a coating on the surface of wire 2. As soon as this operation is completed for one tubular member, that tubular member is removed and replaced by another tubular member in time to have the successive elements of the inoculating wire in that tube coated during the next cam cycle, etc. The operation is thus repeated with another tubular member being processed during each cam cycle.

As each tubular member is removed from the apparatus of FIGS. 2 and 3, with a partial wax coating on portions of wire in each of the tube compartments, a second operational step is performed, as indicated in the device shown in FIG. 7 of the drawings.

FIG. 7 shows a stand having a rectangular base 32 of wood or other non-conducting rigid material, on which is vertically mounted a second slab 31 of similar non-conducting rigid material, in substantially normal relation to 32, and parallel to and stepped back from one edge 32 a distance of say, 7.62 centimeters. A triangular support member 33, also of rigid non-conducting material, is interposed vertically between the base 32 and the rear center of 31 to provide stability. Near the upper end, and at the lower end, of the slab 31, are disposed in fixed, spaced-apart relation, a pair of copper electrode contacts 34 and 35. Each of these is about 2.54 centimeters wide and has an L-shaped section, the legs of each L extending 7.62 centimeters along its edge. In both upper and lower electrodes, one of electrode legs is fastened to the outwardly-directed vertical face of 31, and the other leg projects out horizontally, so that the two horizontally-projecting legs face one another, spaced-apart, say, 15 centimeters. The horizontal leg of the lower electrode 35 is fastened to the upper face of support 32. Each of the horizontally-projecting electrode legs has a V-shaped noch, 34a and 35a, similar to the notches in yokes 5a and 5b of FIGS. 2 and 3. These notches serve to accommodate the wire terminals 2a and 2b of the inoculating wire 2, longitudinally disposed in the multicompartmented tubular member 1, so that the latter can be snapped into place vertically, with the wire terminals 2a and 2b making electrical contact with electrodes 34 and 35.

The circuit is completed by lead wire 37 from the lower electrode 35 to one terminal of a source of power 39, and from the upper electrode 35 through lead wire 36 to the other terminal of power source 39, an on-off switch 38 being interposed in series with the circuit for control purposes. The power source 39 may be of any conventional type, either alternating current or direct current, designed to heat the inoculating wire 2 to a temperature slightly above the melting temperature of the wax coating. In some embodiments, a step-down transformer (not shown) may be interposed in the power line to reduce the voltage to the desired level. In accordance with another alternative, a battery may be used. In the present illustrative embodiment, the wax melts at a temperature of 180° Fahrenheit. In this embodiment, the power source 39 is designed to apply 4 volts, direct current, across the wire 2, producing a current of, say, 2 amperes, with a maximum power rating of 100 watts through the wire. It will be understood as well-known to those skilled in the art, that amount of voltage applied to produce the desired temperature in the wire 2 will depend on its resistance and that of the other elements of the circuit, and will be selected, in each case, to provide just enough heat to melt the wax coating, but insufficient heat to vaporize or oxidize it.

With the tubular member 1 in upright position, when the wax coating melts on the section of wire in each of the compartments, it flows down into the space between the wire 2 and each of the openings 1c, congealing to form a hermetical seal 40 in the space between each of the openings 1c.

Because in the first step of the operation, the depressions or notches 6b provide a relatively generous "puddle" of wax to form the coatings on the portions of wire in each of the compartments. There is, accordingly a sufficient amount of wax deposited in each coating which, when melted during the second step of the operation flows down surrounding the wire 2 to form a seal of wax 40 which has a diameter of about 3.2 millimeters, and a thickness of, say 1.6 millimeters. This seal tends to hold the inoculating rod 2 and each of the compartments of tubular member 1 in sterile relation during the period in which each of the compartments is filled with a different test medium, and the multimedia tubular members are subsequently packaged and shipped.

It will be understood that the present invention is not limited to the specific forms or operations disclosed herein by way of example, but only by the scope of the appended claims.

For example, it is contemplated that the wirecoating process described with reference to FIGS. 2 and 3 of the invention is applicable to other structures than the compartmented multimedia tube shown in FIG. 1. In fact, the two-step process can be used for providing intramural seals for any compartment having a longitudinal opening; and the first step, by itself, can be used for wax coating any wire or other longitudinally extended body.

Furthermore, the word "wax" is used in the specificatin and claims hereinafter in a broad sense to include any sealing materials well-known in the art which melt at a temperature substantially above room temperature, and quickly congeal at room temperature to form a substantially uniform coating or seal which is substantially impervious to liquids or gases.

What is claimed is:

1. For application to a tubular member having a lengthwise opening, and a wire extended longitudinally in said tubular member, said tubular member being subdivided along its length by a series of section walls normal to the plane of said lengthwise opening, and thereby forming a series of compartments having compartment openings conforming to said lengthwise opening, and said section walls each having a series of aligned intramural openings constructed to accommodate said longitudinally extended wire;

an apparatus for cooperating to form seals in said intramural openings comprising in combination:

a vat containing a bath of molten wax;

means for supporting said tubular member so that said compartment openings are directed downward over said bath of molten wax;

means comprising a comb having a series of prongs spaced-apart laterally and disposed in substantial vertical alignment with said tubular member when supported in said supporting means, and positioned so that said prongs are disposed to respectively engage a plurality of said compartment openings simultaneously;

each of said prongs having a recess at its upper end having a depth substantially exceeding the diameter of said wire to accommodate a puddle of wax; and means mechanically coupled to said comb for driving said comb to move up and down vertically in reciprocating motion from a first position below the level of said liquid wax, to a second position in which each of said prongs carrying a puddle of wax is positioned for simultaneous interposition into a plurality of said compartment openings so as to at least partially immerse portions of said wire in each of said compartments to form a wax coating on said wire portions.

2. The combination in accordance with claim 1 wherein each said recess has a V-shaped cross-section.

3. The combination in accordance with claim 2 wherein each of said recesses of V-shaped cross-section is substantially aligned, conforming substantially to a line centered in the thickness of said comb.

4. The combination in accordance with claim 1 which includes an additional device comprising a pair of electrodes disposed one above the other in substantially parallel spaced-apart relation for engaging said tubular member when the same is disposed in a vertical position, so that when said tubular member is so engaged, said wire including said wax-coated portions is disposed in current-carrying engagement with said electrodes to form a circuit;

means comprising a source of electrical power for completing said circuit, causing said wire to heat up to the melting temperature of said wax, whereby said wax flows vertically downward from said wax-coated portions to form seals between said wire and said intramural openings.

5. For use with a wax sealing device for a tubular member having a lengthwise opening, and a wire extended longitudinally in said tubular member, said tubular member subdivided along its length by a series of section walls normal to the plane of said lengthwise opening, and thereby forming a series of compartments having compartment openings conforming to said lengthwise opening, and said section walls each having a series of aligned intramural openings constructed to accommodate said longitudinally-extending wire;

a subcombination comprising a comb having a series of prongs spaced-apart along its length, and dimensioned so that each of said prongs is constructed to fit into a respective one of the compartment openings of said tubular member, but in spaced-apart relation to the section walls of said compartments, each of said prongs having on its upper edge a recess having a depth which substantially exceeds the diameter of said wire for accommodating a puddle of wax, said recess so constructed that when each of said prongs is fitted into a respective one of said compartment openings, portions of said wire in each said compartment are respectively accommodated in said recesses, whereby said wire is at least partially immersed in and coated by a puddle of wax accommodated in said recess.

6. The subcombination in accordance with claim 5 wherein said recesses are V-shaped, and are aligned in the length direction of said comb to accommodate said wire between the legs of said V when the prongs of said comb are in engagement with the respective compartment openings of said tubular member.

7. In a tubular member having a lengthwise opening, and a wire extended longitudinally in said tubular member, said tubular member subdivided along its length by a series of section walls normal to the plane of said lengthwise opening, and thereby forming a series of compartments having compartment openings conforming to said lengthwise opening, and said section walls each having a series of aligned intramural openings constructed to accommodate said longitudinally extended wire;

a first method step in the formation of wax seals at least exceeding one millimeter in diameter and thickness in said intramural openings which comprises:

providing a bath of molten wax;

supporting said tubular member so that said compartment openings are directed downward over said bath of molten wax;

disposing a comb in substantial vertical alignment with said tubular means so that the prongs of said tubular member, which are spaced-apart laterally and dimensioned to correspond with the compartment openings of said tubular member, are positioned to engage said tubular member when said comb is moved up vertically;

shaping the upper end of each of said prongs to include a recess having a depth which substantially exceeds the diameter of said wire constructed to hold a substantial quantity of said molten wax, imposing on said comb a vertical reciprocating motion designed to move said comb from a first position below the level of said bath at which said recesses become filled with molten wax to a second position in which said prongs carrying puddles of said liquid wax in said recesses respectively engage the compartments of said tubular member and at least partially immerse portions of said wire in each of said compartments in said puddles of wax to provide wax coatings on said wire portions.

8. A second step in accordance with claim 7 in the method of forming wax seals at least exceeding one millimeter in diameter and thickness in said intramural openings which comprises subsequent to said first step:

disposing said tubular member in a vertical position so that the terminals of said wire are disposed in current-carrying engagement with an electrical circuit; and applying sufficient electrical power to said circuit to heat up said wire above the melting point of the wax coatings on said wire portions, causing said coatings to melt and flow vertically downward into said intramural openings to form a seal between each of said openings and said wire.

9. An apparatus for depositing a wax coating comprising in combination:

a vat containing a bath of molten wax;

means for supporting a rod over said bath of molten wax;

a device having a recess formed in its upper edge having a depth at least exceeding the diameter of said rod which recess is extended in the length direction of said rod when supported in said supporting means to accommodate a puddle of wax from said bath; and means mechanically coupled to said device for moving said device up and down vertically in reciprocating motion from a first lower position in which said recess is disposed below the level of said bath to pick up a puddle of wax, to a second upper position in which said device including said recess is positioned to at least partially immerse said rod, when disposed in said supporting means, in said puddle to form a wax coating on said rod.

10. The combination in accordance with claim 9 wherein said recess has a V-shaped cross-section in a plane normal to the length direction of said device wherein, when said device is in said second position and said rod is disposed in said supporting means, said rod is interposed between the legs of said V.

11. The method of depositing molten wax on a rod which comprises the steps of:

supporting said rod over a bath of molten wax;

providing a device having a recess formed in its upper edge to accommodate a puddle of wax from said bath;

said recess having a depth exceeding the thickness of said rod;

moving said device up and down vertically in reciprocating motion from a first lower position in which said recess is disposed below the level of said bath to pick up a puddle of wax, to a second upper position in which said recess is positioned to at least partially immerse said rod in said puddle of wax to form a wax coating on said rod.

12. An apparatus for providing intramural wax seals in a compartment substantially closed on three sides and having an open side along one plane, wherein a wire is interposed into said compartment through intramural openings in the lateral walls thereof, in a direction substantially parallel to said one plane, the terminals of said wire extending beyond said lateral walls;

a container of a bath of molten wax;

means for utilizing the terminals of said wire to support said compartment with said open side directed downward toward said bath;

a device comprising at least one projection dimensioned for accommodation in said compartment, said projection having a recess formed in its upper edge designed to pick up a puddle of wax from said bath, said recess having a depth exceeding the thickness of said wire, and extending in the principal direction of said wire when disposed in said supporting means;

means mechanically coupled to said device for moving said device up and down vertically in reciprocating motion from a first lower position in which said recess is disposed below the level of said bath to pick up a puddle of wax, to a second upper position in which said recess including said puddle of wax is positioned to at least partially immerse said wire in said puddle of wax to form a coating on said wire;

additional means comprising a pair of electrodes disposed one above the other in substantially parallel spaced-apart relation for engaging said compartment including the terminals of said wax-coated wire, wherein said wire is disposed in substantially vertical current-carrying relation between said electrodes; and means for completing the circuit to said electrodes causing said wax-coated wire to heat up to the melting point of said wax, thereby causing said wax to flow down vertically to form a wax seal between at least one said intramural opening and said wire.

13. The method of providing intramural wax seals in a compartment substantially closed on three sides and having an open side along one plane, wherein a wire is interposed into said compartment in a direction substantially parallel to said one plane through intramural openings in the lateral walls thereof, the terminals of said wire extending beyond said lateral walls;

providing a bath of molten wax;

utilizing the terminals of said wire to support said compartment with said open side directed downward toward said bath;

providing a device having at least one projection dimensioned for accommodation in said compartment;

forming a recess at least exceeding the thickness of said wire in the upper edge of said at least one projection designed to pick up a puddle of wax from said bath, wherein said recess is extended in the principal direction of said wire when disposed in said supporting means;

moving said device up and down vertically in reciprocating motion from a first lower position in which said recess is disposed below the level of said bath for picking up said puddle of wax, to a second upper position wherein said recess including said puddle of wax is positioned to at least partially immerse said wire in said puddle of wax, forming at least a partial wax coating on said wire;

subsequently, after said wire is at least partially coated, disposing said wax coated wire enclosed in said compartment in substantially vertical current-carrying relation between the electrodes of an electrical circuit; and completing said electrical circuit to a source of electrical power to provide sufficient heat to heat up said wax coating to the melting point, whereby said wax coating is caused to melt and flow down vertically forming a wax seal between at least one said intramural opening and said wire.

* * * * *